(12) United States Patent
Li et al.

(10) Patent No.: US 7,964,651 B2
(45) Date of Patent: Jun. 21, 2011

(54) SULFONYL GRAFTED HETEROCYCLE MATERIALS FOR PROTON CONDUCTING ELECTROLYTES

(75) Inventors: Siwen Li, Atlanta, GA (US); Zhen Zhou, Atlanta, GA (US); Yuelan Zhang, Atlanta, GA (US); Meilin Liu, Norcross, GA (US); Wen Li, Ann Arbor, MI (US)

(73) Assignees: Toyota Motor Engineering & Manufacturing North America, Inc., Erlanger, KY (US); Georgia Tech Research Corporation, Atlanta, GA (US)

( * ) Notice: Subject to any disclaimer, the term of this patent is extended or adjusted under 35 U.S.C. 154(b) by 1184 days.

(21) Appl. No.: 11/614,198

(22) Filed: Dec. 21, 2006

(65) Prior Publication Data

US 2008/0152985 A1 Jun. 26, 2008

(51) Int. Cl.
*H01M 4/02* (2006.01)
*B01J 41/14* (2006.01)

(52) U.S. Cl. .............. 521/32; 521/27; 521/33; 429/535; 429/529

(58) Field of Classification Search ............... 521/27, 521/32, 33; 429/33, 41, 535, 529
See application file for complete search history.

(56) References Cited

U.S. PATENT DOCUMENTS

| | | | |
|---|---|---|---|
| 3,574,593 A | 4/1971 | Lutz et al. | |
| 5,283,310 A * | 2/1994 | Armand et al. | 528/30 |
| 5,525,436 A | 6/1996 | Savinell et al. | |
| 5,827,602 A | 10/1998 | Koch et al. | |
| 6,310,110 B1 | 10/2001 | Markowitz et al. | |
| 6,531,539 B2 | 3/2003 | Krafczyk et al. | |
| 6,878,475 B2 | 4/2005 | Wixom et al. | |
| 6,949,616 B2 | 9/2005 | Jacob et al. | |
| 6,987,163 B2 | 1/2006 | Cabasso et al. | |
| 2002/0045085 A1 | 4/2002 | Formato et al. | |
| 2004/0122256 A1* | 6/2004 | Ikeda et al. | 562/1 |
| 2005/0089741 A1* | 4/2005 | Nakano et al. | 429/33 |
| 2006/0111530 A1 | 5/2006 | Li et al. | |

FOREIGN PATENT DOCUMENTS

| | | | |
|---|---|---|---|
| JP | 2005-029655 | * | 2/2005 |
| WO | 2004/107477 | | 12/2004 |
| WO | WO 2005/072413 | | 8/2005 |

* cited by examiner

*Primary Examiner* — Ling-Siu Choi
(74) *Attorney, Agent, or Firm* — Gifford, Krass, Sprinkle, Anderson & Citkowski, P.C.

(57) ABSTRACT

A proton conducting polymer includes a polymer backbone and a heterocyclic compound attached to the polymer backbone. The heterocyclic compound includes a sulfonyl functionality bonded to heterocyclic compound.

16 Claims, 2 Drawing Sheets

SULFONYL GRAFTED HETEROCYCLE MATERIALS FOR PROTON CONDUCTING ELECTROLYTES

FIELD OF THE INVENTION

The invention relates to heterocycle containing compounds and compositions.

BACKGROUND OF THE INVENTION

Proton electrolyte membranes (PEMs) may be utilized in various devices including fuel cells, purification and reforming cells as well as in other electrochemical applications.

Various materials have been investigated for use as PEMs. Examples include perfluorosulfonic polymers, as well as various imidazole polymers including polybenzimidazole-$H_3PO_4$, polyvinazine $HPO_4$, as well as other imidazole based materials. Imidazole is an aromatic heterocycle having two nitrogen atoms on a ring. Imidazole conducts protons through intermolecular proton transfer or structure diffusion. However, the electrochemical stability of imidazole ring based materials appears to be inadequate for fuel cell applications.

Metals contained within PEM fuel cells such as platinum or other catalysts have the ability to form strong bonds with nitrogen contained within the imidazole rings such that the catalyst will become poisoned or less active. Additionally, oxidation of imidazole in the potential region of oxygen reduction as well as the oxidation of products of imidazole may be absorbed onto the surface of a precious metal catalyst or electrode thereby reducing the efficacy of the electrode surface area.

There is therefore a need in the art for a proton conducting polymer for use in fuel cells that has a high proton conductivity but is not subject to varying efficacy at various humidity values and at temperatures above 100° C. Additionally, there is a need in the art for a proton conducting polymer that has a chemical stability and compatibility with a precious metal catalyst in a fuel cell environment.

SUMMARY OF THE INVENTION

A proton conducting polymer includes a polymer backbone and a heterocyclic compound attached to the polymer backbone. The heterocyclic compound includes a sulfonyl functionality bonded to the heterocyclic compound.

DETAILED DESCRIPTION OF THE PREFERRED EMBODIMENTS

Figure 1:
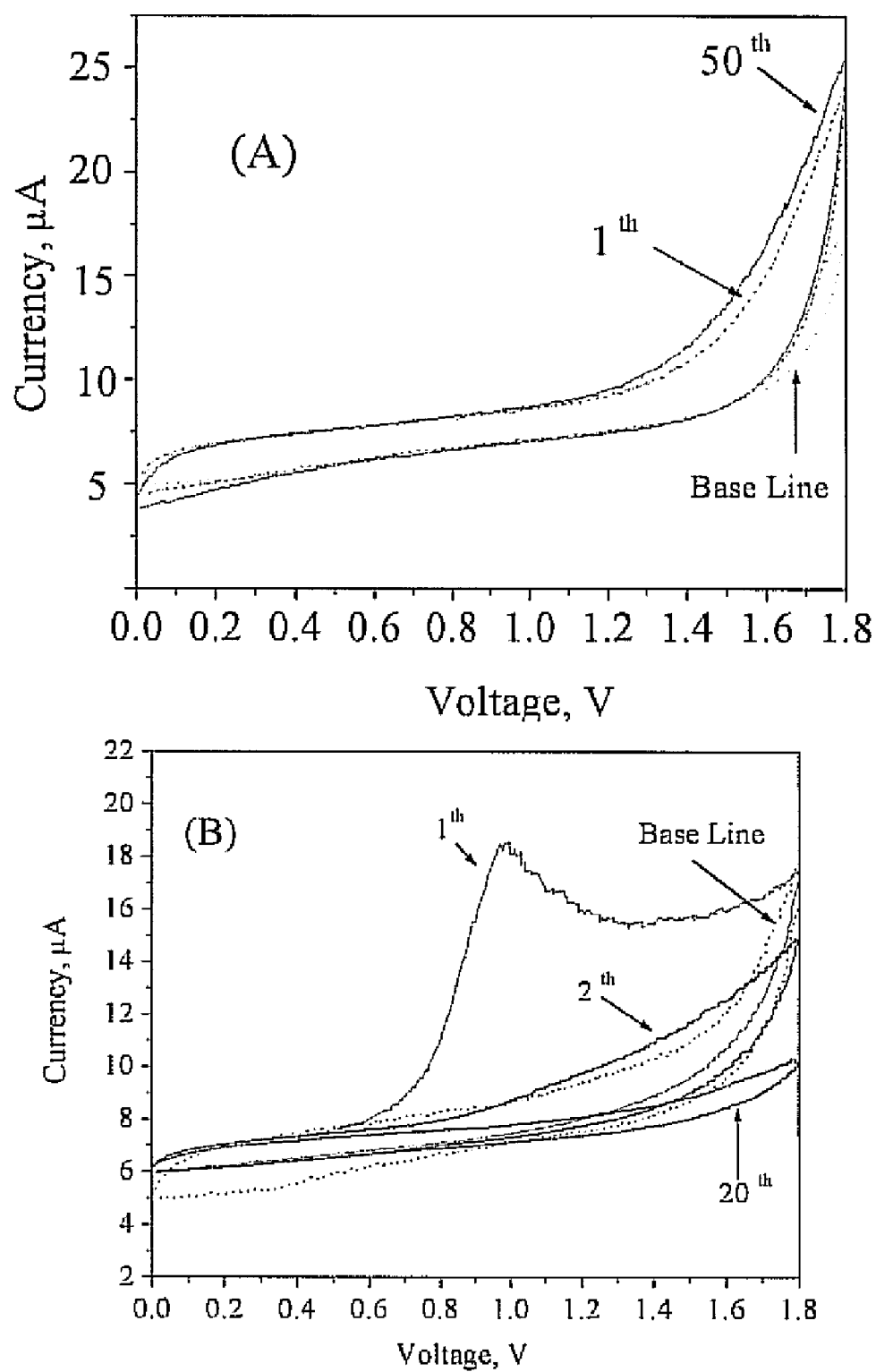
FIG. 1 is a plot of the currency of 2-ethylsulfonyl-imidazole and imidazole.

Polymers described herein include linear polymers, copolymers, polymer precursors, as well as hybrid inorganic-organic polymers and composites and have utility for use in proton exchange membranes (PEMs).

As the term "polymer" is used throughout the specification, it may refer to polymers, copolymers, as well as hybrid inorganic and organic polymers. Additionally, the term "PEM" refers to proton exchange membranes or polymer electrolyte membranes that may be used as proton conducting materials in various electrochemical applications.

A proton conducting polymer includes a polymer backbone and a heterocyclic compound attached to the polymer backbone. The heterocyclic compound includes a sulfonyl functionality bonded to the heterocyclic compound. The heterocyclic compound may include a linear organic compound that is attached thereto. The linear organic compound may have from 1 to 20 carbons. Additionally, the heterocyclic compound may include a linear organic compound having from 1 to 20 carbons attached to the sulfonyl functionality.

Various heterocyclic compounds may be utilized in the proton conducting polymer including 1,2,4-triazole, 1,2,3-triazole, 1H-benzotriazole, pyrimidine, pyrazine, purine, imidazole, pyrazole, pyridine, and derivatives thereof. While various heterocyclic compounds may be utilized by the invention, a preferred heterocycle includes imidazole. The sulfonyl group attached to the heterocyclic compound has a very strong electron withdrawing effect and may increase the electrochemical stability and reduce interaction between the heterocyclic rings and a precious metal catalyst within a fuel cell.

Various polymer backbone compositions may be utilized including polyalkene, polyepoxy, perfluoroalkene, polysiloxane, poly-p-phenylene, polyphenylene oxide, poly-p-phenylene sulfone, polyetheretherketone, Udel polysulfone, and polybenzimidazole. The polymer backbone may also include acid groups attached thereon such as $H_3PO_4$, $H_2SO_4$, $CF_3SO_2NHSO_2CF_3$, $CF_3SO_3H$, $CH_3SO_3H$, and $CF_3PO_3H_2$. It should be realized that other acid groups other than those listed above may be incorporated into the polymer backbone. The polymer backbone may also include sulfonated or phosphonated polymers or copolymers. Examples of sulfonated or phosphonated polymers or copolymers include polystyrene sulfonic acid, sulfonated polyetheretherketone, perfluorosulfonic acid, and sulfonated polyphenylene sulfide.

In another aspect, the polymer backbone may be a hybrid inorganic-organic polymer. Exemplary hybrid inorganic-organic polymers may have a silicon functionality. Various silicon functionalities including silane and siloxane functionalities may be present in the hybrid inorganic-organic polymer. Additionally, the hybrid inorganic-organic polymer may include an acid group attached thereon. The acid groups may be similar to those described above with respect to the polymer backbone or may include other known acidic groups compatible with the hybrid inorganic-organic polymer.

The structure of the proton conducting polymer may vary as to the relationship of the heterocyclic compound and sulfonyl group in relation to the polymer backbone. In one aspect, the proton conducting polymer may have the formula:

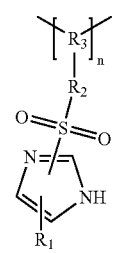

wherein $R_3$ represents the polymer backbone, $R_2$ is a linear organic group having 1 to 20 carbons, and $R_1$ is a hydrogen or organic group having 1 to 20 carbons. As can be seen from the above structure, the polymer backbone may be linked to the sulfonyl group through a linear organic group having from 1 to 20 carbons. The heterocyclic group, in this case an imidazole, is bonded to the sulfonyl group and positioned sterically outward with respect to the sulfonyl group.

The proton conducting polymer may also have the formula:

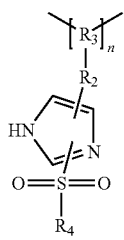

wherein $R_3$ represents the polymer backbone, $R_2$ is a linear organic group having 1 to 20 carbons, and $R_4$ is linear organic group having 1 to 20 carbons. As with the previously described formula, a polymer backbone is linked this time to a heterocyclic compound with imidazole being shown. The heterocyclic compound is attached to the sulfonyl group which is positioned sterically outboard relative to the heterocyclic compound.

The polymer backbone of both of the above formulas may be any of the previously described polymer backbones including any of the described polymers and copolymers with acids attached thereto or hybrid inorganic-organic polymer compositions.

The proton conducting polymers may be utilized as an electrolyte membrane in a fuel cell. The electrolyte membranes may be disposed between an anode and cathode of a fuel cell with the proton transfer membrane formed of the various proton conducting polymer compositions described above.

The proton conducting polymer may be formed by various mechanisms that include varying structures as described above and as disclosed in the following examples.

Example 1

Electrochemical Stability of 2-ethylsulfonyl-imidazole

Referring to FIG. 1, there is shown cyclic voltammograms for 2-ethylsulfonyl-imidazole and imidazole in $CH_3CN$ solution purged with nitrogen. The cyclic voltammetric measurements were performed in a three electrode cell having 0.1 mol·dm$^{-3}$ $CH_3CN$ solution of tetrabutylammonium hexafluorophosphate (TBAPF6) and $5 \times 10^{-3}$ mol·DM$^{-3}$ of imidazole or 2-ethylsulfonyl-imidazole using a platinum work electrode and a platinum auxiliary electrode and a silver Ag/Ag$^+$ reference electrode having 0.1 mol·dm$^{-3}$ AgNO$_3$—CH$_3$CN containing 0.1 mol·dm$^{-2}$ TBAPF6. As can be seen from the figure, a large oxidation peak appeared close to 1.0 volts in the voltammagram for imidazole. It was found that the oxidation products of imidazole were absorbed on the surface of the platinum electrode thus blocking the surface area of the electrode. In contrast, no redox peaks were observable for 2-ethylsulfonyl-imidazole in a wider potential range, 0 to 1.8 volts versus the reference electrode. No changes took place in a 50 cycle test. After 50 cycles, imidazole was added to the solution with 2-ethylsulfonyl-imidazole and a large oxidation peak appeared. A similar result was observed when the CH$_3$CN solutions were purged with O$_2$, implying that 2-ethylsulfonyl-imidazole has an improved electrochemical stability under fuel cell conditions.

Example 2

Mixture of 2-ethylsulfonyl-imidazole and Benzenesulfonic Acid 2-ethylsulfonyl-imidazole was prepared using the following method. A 2-mercaptoimadazole is reacted with an alkyl halide in an aqueous alkaline solution to prepare a 2-alkylthioimidazole. Next the 2-alkylthioimidazole is oxidized using typical oxidizing agents to produce the 2-alkylimidazole.

Figure 2:
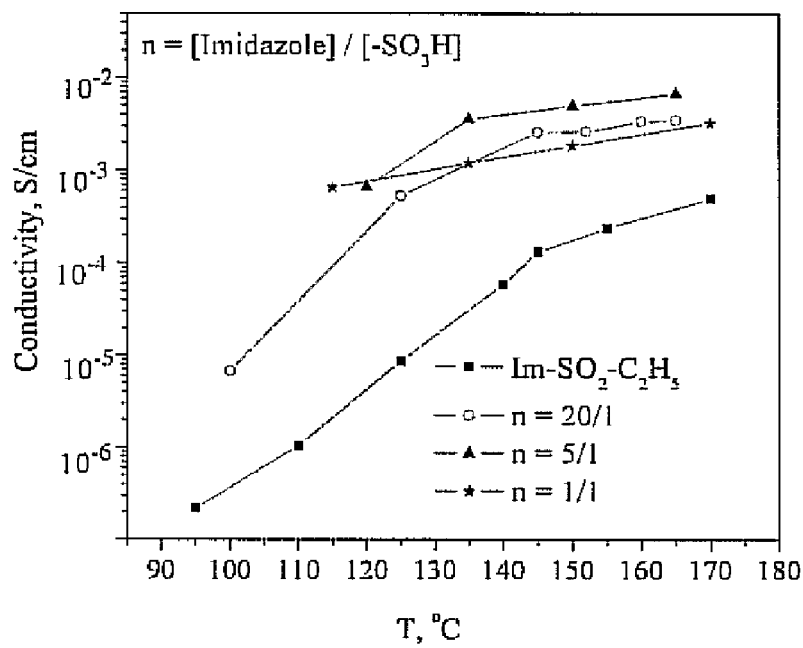
FIG. 2 is a plot of the conductivity versus temperature for 2-ethylsulfonyl-imidazole and benzenesulfonic acid as well as various ratios of imidazole and benzenesulfonic acid.

2-ethylsulfonyl-imidazole and benzenesulfonic acid were dissolved in methanol and stirred for 10 minutes. The solvent was then removed under vacuum and the resulting mixture was sealed in a glass tube and its conductivity was measured utilizing a standard electrode made of two platinum pieces. The measurements were also conducted on various mixtures of imidazole with reference to benzenesulfonic acid. The results of the measurements are shown in FIG. 2 showing a plot of the conductivity of the various materials as a function of temperature. As can be seen from the figure, the mixture of ethylsulfonyl-imidazole and benzenesulfonic acid exhibits a more linear conductivity behavior across a varying temperature range in comparison to the various imidazole mixtures.

Example 3

Hybrid Inorganic-Organic Polymer with a Grafted Sulfonyl Imidazole

The formation of a hybrid inorganic-organic polymer may be represented by the following reaction.

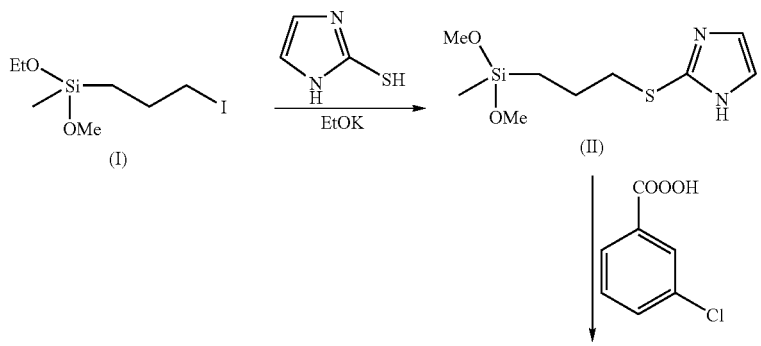

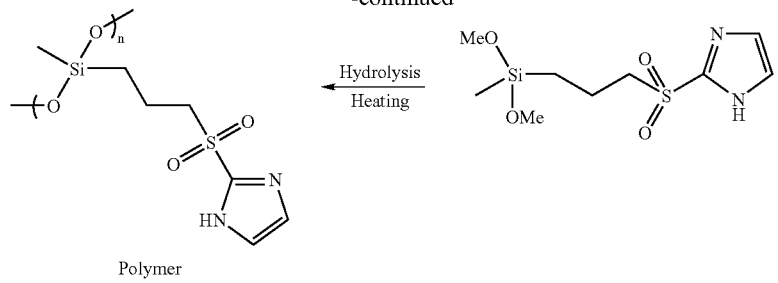

Polymer

Figure 3:
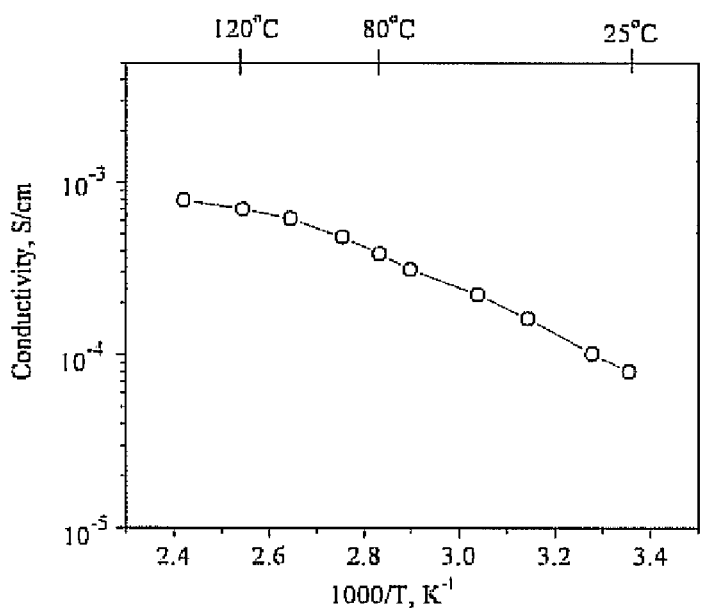
FIG. 3 is a plot of the conductivity versus temperature of a linear hybrid inorganic-organic polymer having a grafted sulfonyl imidazole.

As can be seen from the above reaction, a mixture of 2-mercaptoimidazole, EthOK and a methylethyl siloxane based material was stirred at room temperature for 24 hours and then precursor II was separated by filtration through a silicate gel column chromatography eluted with ethyl acetate. Next the precursor II was oxidized by peroxide 3-chloroperoxybenzoic acid with 20% water in ethanol and the product was precipitated with ether. The resulting product was heated at 75° C. for 48 hours to obtain a solid polymer at room temperature which becomes soft above 75° C. The proton conductivity of the polymer is plotted in FIG. 3 as a function of temperature. The conductivity was measured using a similar measuring apparatus as that described above. As can be seen from the plot, the conductivity displays a linear relationship in relation to temperature similar to that described above with the foregoing plots.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A proton conducting polymer comprising:
   a polymer backbone; and
   a heterocyclic compound attached to the polymer backbone, the heterocyclic compound having a sulfonyl functionality bonded to the heterocyclic compound wherein the proton conducting polymer has the formula:

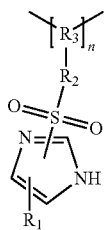

wherein $R_3$ represents the polymer backbone, $R_2$ is a linear organic group having 1 to 20 carbons and $R_1$ is a hydrogen or organic group having 1 to 20 carbons.

2. The proton conducting polymer of claim 1 wherein the polymer backbone comprises polyalkene, polyepoxy, perfluoroalkene polymers, polysiloxane, poly-p-phenylene, polyphenylene oxide, poly-p-phenylene sulfone, polyetheretherketone, Udel polysulfone, and polybenzimidazole.

3. The proton conducting polymer of claim 2 wherein the polymer backbone includes an acid group attached thereon.

4. The proton conducting polymer of claim 3 wherein the acid groups comprise $H_3PO_4$, $H_2SO_4$, $CF_3SO_2NHSO_2CF_3$, $CF_3SO_3H$, $CH_3SO_3H$, and $CF_3PO_3H_2$.

5. The proton conducting polymer of claim 1 wherein the polymer backbone includes sulfonated or phosphonated polymers or copolymers.

6. The proton conducting polymer of claim 5 wherein the sulfonated or phosphonated polymers or copolymers comprise polystyrene sulfonic acid, sulfonated polyetheretherketone, perfluorosulfonic acid, and sulfonated polyphenylene sulfide.

7. A proton conducting polymer comprising:
   a polymer backbone; and
   a heterocyclic compound attached to the polymer backbone, the heterocyclic compound having a sulfonyl functionality bonded to the heterocyclic compound wherein the proton conducting polymer has the formula:

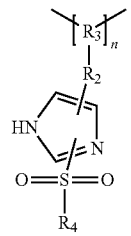

wherein $R_3$ represents the polymer backbone, $R_2$ is a linear organic group having 1 to 20 carbons and $R_4$ is a linear organic group having 1 to 20 carbons.

8. The proton conducting polymer of claim 7 wherein the polymer backbone comprises polyalkene, polyepoxy, perfluoroalkene polymers, polysiloxane, poly-p-phenylene, polyphenylene oxide, poly-p-phenylene sulfone, polyetheretherketone, Udel polysulfone, and polybenzimidazole.

9. The proton conducting polymer of claim 8 wherein the polymer backbone includes an acid group attached thereon.

10. The proton conducting polymer of claim 9 wherein the acid groups comprise $H_3PO_4$, $H_2SO_4$, $CF_3SO_2NHSO_2CF_3$, $CF_3SO_3H$, $CH_3SO_3H$, and $CF_3PO_3H_2$.

11. The proton conducting polymer of claim 7 wherein the polymer backbone includes sulfonated or phosphonated polymers or copolymers.

12. The proton conducting polymer of claim 11 wherein the sulfonated or phosphonated polymers or copolymers comprise polystyrene sulfonic acid, sulfonated polyetheretherketone, perfluorosulfonic acid, and sulfonated polyphenylene sulfide.

13. A proton conducting polymer comprising:
   a polymer backbone wherein the polymer backbone comprises a hybrid inorganic-organic polymer; and
   a heterocyclic compound attached to the polymer backbone, the heterocyclic compound having a sulfonyl functionality bonded to the heterocyclic compound.

14. The proton conducting polymer of claim 13 wherein the hybrid inorganic-organic polymer comprises a compound having a silicon functionality.

15. The proton conducting polymer of claim 14 wherein the silicon functionality comprises silane, and siloxane functionalities.

16. The proton conducting polymer of claim 13 wherein the hybrid inorganic-organic polymer includes an acid group attached thereon.

* * * * *